W. I. STAAF.
MECHANISM FOR WEIGHING LIQUIDS.
APPLICATION FILED MAR. 21, 1912.

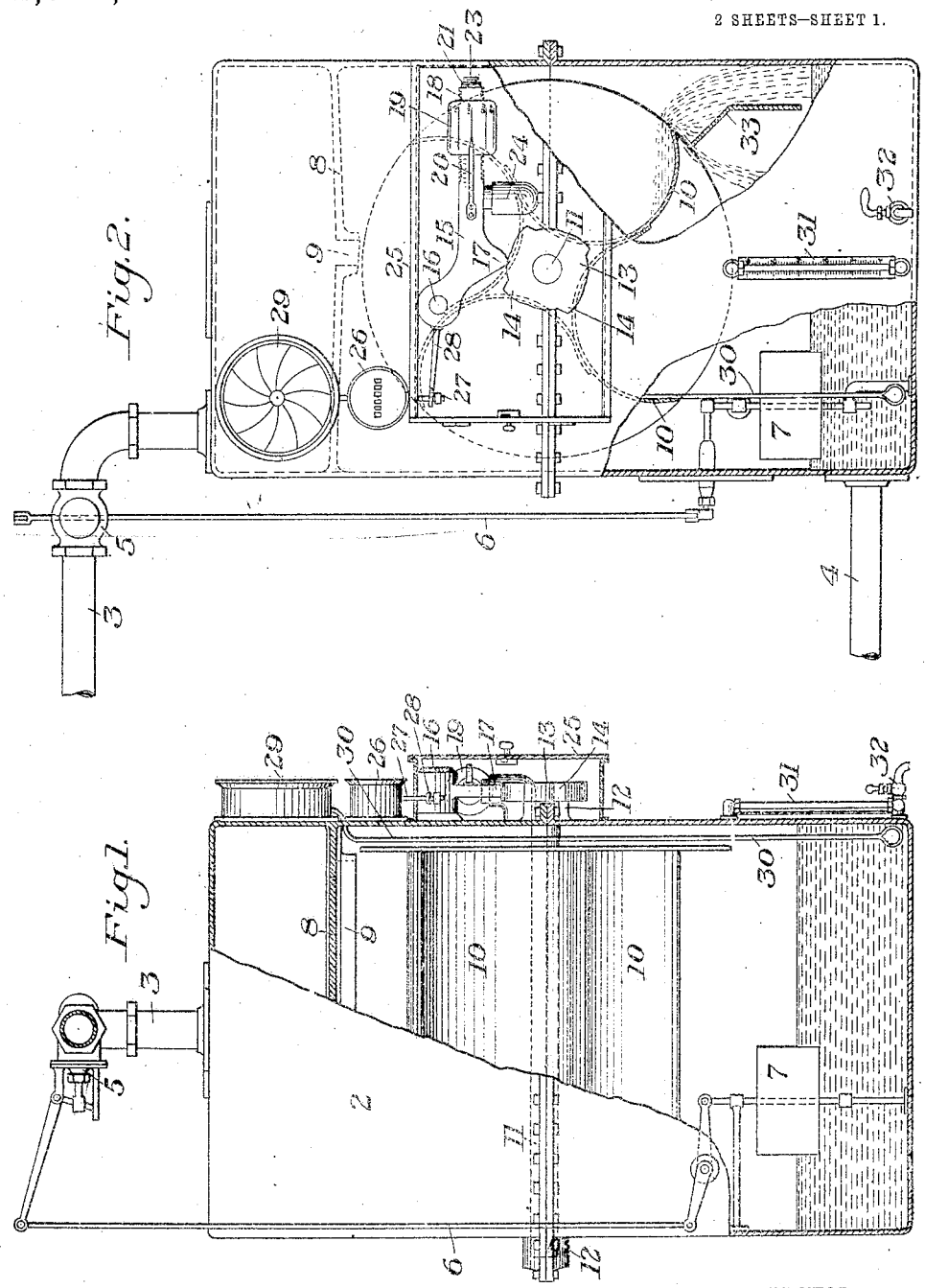

1,082,614.

Patented Dec. 30, 1913.
2 SHEETS—SHEET 2.

WITNESSES
R A Balderson

INVENTOR
W. I. Staaf

UNITED STATES PATENT OFFICE.

WERNER I. STAAF, OF PITTSBURGH, PENNSYLVANIA, ASSIGNOR OF ONE-HALF TO EDWARD B. TYLER, OF PITTSBURGH, PENNSYLVANIA.

MECHANISM FOR WEIGHING LIQUIDS.

1,082,614. Specification of Letters Patent. Patented Dec. 30, 1913.

Application filed March 21, 1912. Serial No. 685,315.

*To all whom it may concern:*

Be it known that I, WERNER I. STAAF, of Pittsburgh, Allegheny county, Pennsylvania, have invented a new and useful Mechanism for Weighing Liquids, of which the following is a full, clear, and exact description, reference being had to the accompanying drawings, forming part of this specification, in which—

Figure 3:
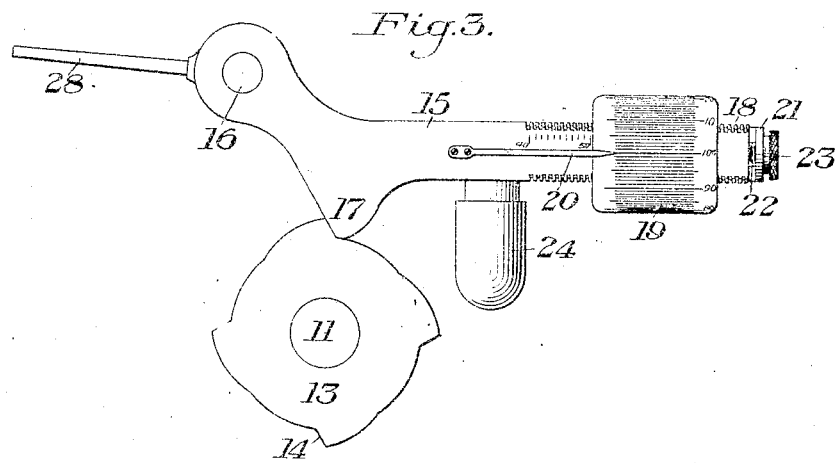
Figure 4:
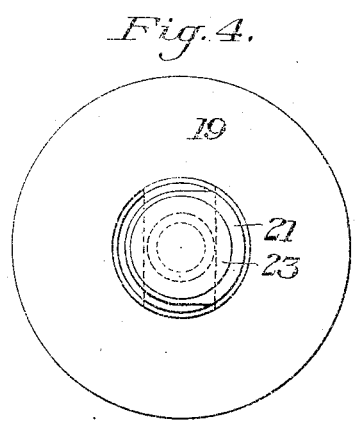
Figure 5:
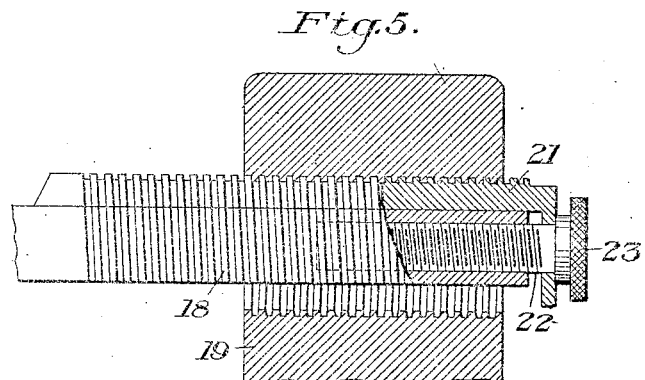

Figure 1 is a side view, partly broken away, of a device embodying my invention; Fig. 2 is an end view of the same, also partly broken away, to show the interior; Fig. 3 is a detail view of the weight and trip device; and Figs. 4 and 5 are respectively end and sectional views showing the locking means for the adjustable weight.

My invention has relation to means for weighing liquids, and particularly water; and is also especially designed for weighing liquids of variable temperatures.

It is well known that the density and weight of water and other liquids varies with the temperature thereof; and for many purposes, a meter which simply measures the weight or volume of water passing therethrough, without regard to its temperature, gives insufficient data upon which to base further determinations. For instance, in testing the efficiency of a boiler, in order to determine the amount of water evaporated by the boiler in a given time, it is necessary to know not only the total weight of water evaporated, but also the temperature of the feed water supplied to the boiler.

My invention provides a simple and efficient weighing device, in which account may be taken of variations of temperature, and in which the reading will include the effect of such variations by reducing the weight or volume indicated to a definite standard.

The precise nature of my invention will be best understood by reference to the accompanying drawings, in which I have shown the preferred embodiment thereof, and which will now be described, it being premised, however, that various changes can be made in the details of construction and arrangement of the several parts without departing from the spirit and scope of my invention as defined in the appended claims.

In these drawings, the numeral 2 designates a suitable tank or receptacle, which is preferably closed except for an inlet connection 3 at the upper portion, and an outlet connection 4 at its lower portion. The inlet 3 is controlled by a valve 5; and this valve is in turn controlled by connections 6 operated by a float 7 placed in the lower portion of the vessel, which constitutes a water storage space or reservoir.

The upper portion of the vessel is provided with a transverse horizontal partition 8, forming an admission chamber having a bottom discharge opening 9, which is located directly over a series of buckets 10, which are rigidly secured to a shaft 11 extending transversely across the vessel and journaled in suitable bearings 12 carried by the end walls thereof. The shaft 11 extends through one of the end walls of the casing, and has rigidly secured thereto a cam ratchet wheel 13, which is provided with as many teeth or cams 14 as there are buckets 10.

15 is a weighted lever, pivoted at 16, and having a pawl portion 17 which rests upon the wheel 13. The free end portion of the lever 15 is formed with a spiral thread 18, which is engaged by the internal thread of an adjustable weight 19. The threads are graduated so that one rotation of the weight will be equivalent to a certain number of pounds, or cubic inches, of water, and the weight itself is graduated, as indicated, so that partial turns thereof will also be equivalent to fractions of a pound, etc. A point or indicator 20 is secured to the lever to coöperate with the graduation marks on the weight to determine the proper setting thereof.

For the purpose of locking the weight in its adjusted position, I provide suitable means, such as that shown in Figs. 4 and 5. The means here shown consists in providing the threaded end portion of the lever arm with a locking or wedging segment 21, and which is actuated by a screw 22, having the thumb nut 23. By manipulating this nut, it will be readily seen that the wedging segment 21 may be moved so as to bind its segmental threads against the faces of the threads in the weight and thereby lock the weight against accidental movement. 24 is a stop which limits the downward movement of the weighted lever arm. The mechanism just described is preferably inclosed in an auxiliary casing 25 secured to the end wall of the tank or vessel.

26 designates a suitable counter or register of any well known form, and which is actuated by having its stem 27 engaged by a tail projection 28 of the lever 15.

29 indicates a recording thermometer of any well known form, having a thermometric element 30 extending downwardly within one end portion of the tank or vessel into the water space thereof.

31 is a gage for indicating the amount of water in the bottom of the vessel, and 32 is a drain cock.

33 is an internal wall behind which the buckets are arranged to discharge, and which affords a certain amount of resistance to give reactance to the buckets.

The operation is as follows: As each bucket is filled with a certain volume and weight of water received through the discharge opening 9, the weight of this water overcomes the action of the weighted lever on the wheel 13 and permits the shaft 11 to rotate to cause the bucket to discharge. The movement of the lever, effected as each tooth 13 passes the pawl projection 17 of the lever, actuates the counter 26. If the counter is arranged to indicate weight of water, each operation of the lever 15 will add to the indication of the counter one unit of weight; or, if the counter is made to indicate volume, then each movement of the lever will cause the counter to show an added unit of volume. Inasmuch as the temperature of the water received by the buckets may vary considerably, it is necessary, in order to take into account this temperature of variations in the readings of the counter, to adjust the weight so that the buckets will trip under a greater or less load, that is to say, if the temperature of the water increases, the adjustable weight will be moved so as to require each bucket to receive a somewhat greater amount of water before it will trip; and if the temperature decreases the weight will be adjusted in the opposite direction so that the bucket will trip with a somewhat less weight of water. The adjustment of the weight is performed manually, and is controlled by the indications given by the recording thermometer 29. In this way, the counter may be made to give a reading which takes into account the temperature variations. While each movement of the counter adds either a definite unit of weight or volume to its indication, yet the actual amount of water may be greater or less than this unit, but, with the proper adjustment of the weights, the readings given by the counter are reduced to some definite standard, such as the weight of water at its maximum density.

By noting the amount of water in the tank or receptacle, as indicated by the gage 31 at the beginning of the test, and by taking the reading of this gage after the test has been completed, an accurate determination can be had of the amount of water which has gone to the boiler through the outlet 4, as reduced to the proper standard. Where the temperature of the water varies but little, or accurate determinations of variation are not necessary, the weight can be given the proper adjustment for the temperature indicated and allowed to remain in such adjusted position.

The invention is simple in its construction and method of operation, and can be used for a variety of purposes, where it is desired to get an accurate measurement of liquid.

What I claim is:—

1. An apparatus for weighing the amount of liquid passed therethrough and for simultaneously recording the temperature thereof, comprising a tank or vessel having a liquid inlet, and a liquid storage chamber, a liquid weighing device intermediate the inlet and the storage space or chamber and arranged to deliver the liquid to the latter, a register operatively connected with the weighing device, a thermostatic element extending into the liquid adjacent to the outlet of said space or chamber, and a recording device actuated by the said element; substantially as described.

2. In an apparatus for weighing liquids, a shaft having a series of buckets, a cam member of said shaft, a lever resting on the cam member, a weight threaded on the lever, both the weight and the lever arm being graduated, and the lever having a threaded locking segment engaging the weight; substantially as described.

In testimony whereof, I have hereunto set my hand.

WERNER I. STAAF.

Witnesses:
H. M. CORWIN,
GEO. H. PARMELEE.